June 12, 1923.
W. H. WAMBSGANS
1,458,788
JOINT FOR ARTIFICIAL LIMBS
Filed June 27, 1921
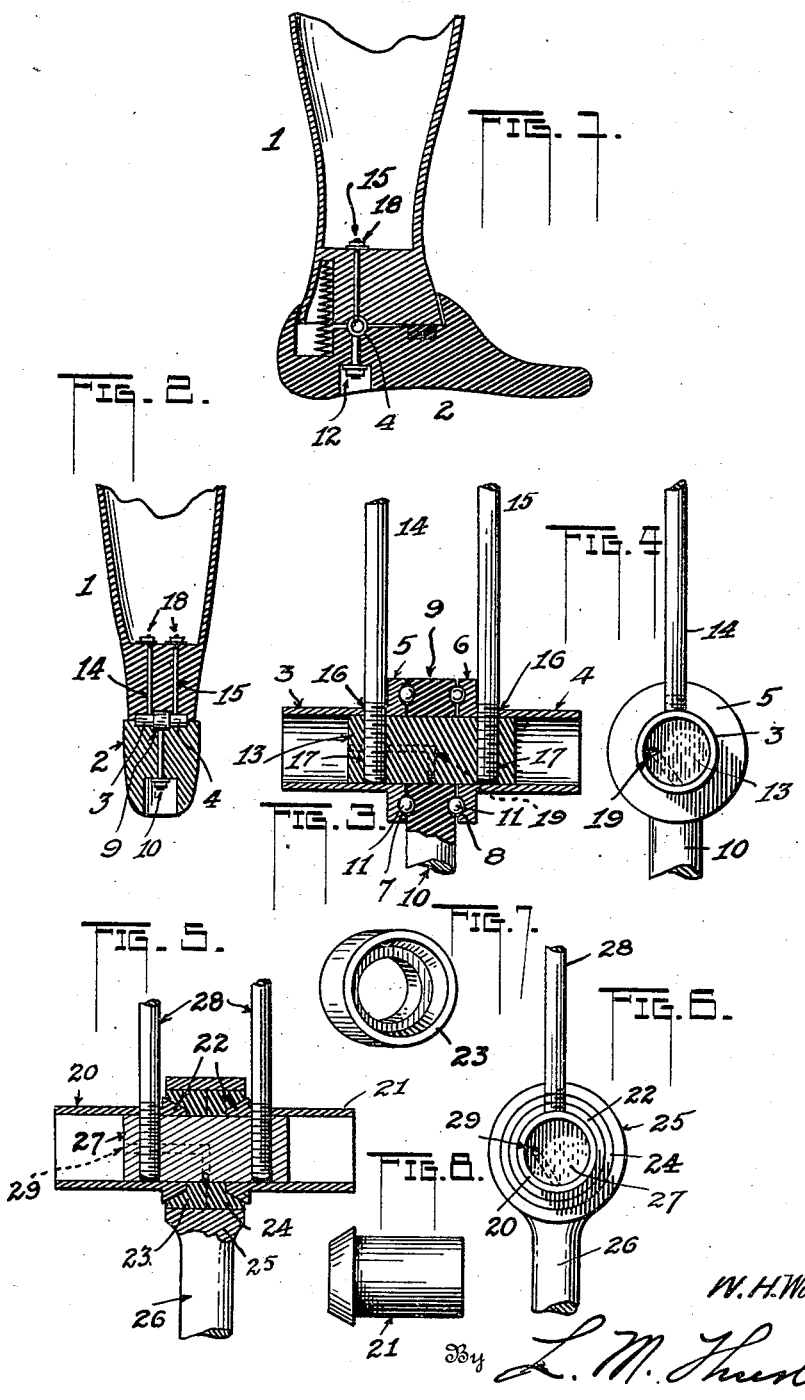
Inventor
W. H. Wambsgans.
By L. M. Thurlow
Attorney Patented June 12, 1923.

1,458,788

UNITED STATES PATENT OFFICE.

WILLIAM H. WAMBSGANS, OF PEORIA, ILLINOIS.

JOINT FOR ARTIFICIAL LIMBS.

Application filed June 27, 1921. Serial No. 480,566.

*To all whom it may concern:*

Be it known that I, WILLIAM H. WAMBSGANS, a citizen of the United States, residing at Peoria, in the county of Peoria and State of Illinois, have invented certain new and useful Improvements in Joints for Artificial Limbs; and I do hereby declare that the following is a full, clear, and exact description of the invention, which will enable others skilled in the art to which it appertains to make and use the same.

This invention relates to artificial limbs, pertaining more particularly to a joint for the parts of the same, and more especially the ankle-joint.

The object of the invention is that of providing a thoroughly strong and staunch connection between the parts of an artificial limb, one that will operate freely and that will not creak or squeak as occurs in many joints as usually constructed.

To the end that my invention may be thoroughly understood, I have provided the accompanying drawing in which, Figure 1 shows a vertical longitudinal section of an artificial limb with my invention applied thereto as an ankle joint.

Figure 2 is a vertical lateral section of the same.

Figure 3 is a longitudinal vertical section of a form of joint of my invention.

Figure 4 is a side elevation thereof.

Figure 5 is a longitudinal vertical section of a slightly modified form of joint.

Figure 6 is a side elevation of the same.

Figure 7 shows, in perspective, a cone bearing shown in Figure 5, and

Figure 8 is a side elevation of a coned member adapted to cooperate with the cone in Figure 4.

My invention is shown in connection with the ankle portion of an artificial limb shown in Figure 1, wherein 1 is a leg portion and 2, a foot portion.

In one of its forms, the joint comprises two tubular portions 3, 4 each having at one end a flange designated by 5 and 6, each having a ball race 7 and 8 respectively, the races lying in a plane perpendicular to the axis of the said portions. Lying between the flanges is a member 9 having a ball race in opposite faces corresponding in position to the ball races of said flanges, there being a series of balls 11 disposed in the annular cavities thus provided.

The member 9 is extended into a stem portion 10 which extends through the foot portion 2, Figure 1, and adapted to receive a securing nut 12.

Said member is bored out, and in this instance, its bore is of the same diameter as the bores of the said tubular portions 3, 4.

13 is a main body portion or bushing lying within both the tubular portions 3, 4 and the member 9, the same being machined to a smooth working fit. It serves to centralize the several portions within which it lies and about which the member 9 can rock while the portions 3, 4 are fixed with respect thereto.

That is to say, 14, 15 are two rods, each of which at one of its ends passes through a hole 16 in one of the tubular members and screws into threaded holes 17 in the said bushing 13, the position of the holes 15, 16 being such, with respect to one another, that when the rods are secured in place, the flanges 5, 6 will be held snugly up to the central member 9 in a smooth working relation upon the balls 11.

The rods extend through a portion of the leg 1 substantially as shown in Figure 1 and receive nuts 18.

A duct 19 extends into one end of the bushing into which oil may lead down to the working surface between the member 9 and the latter.

In Figure 5, two tubular portions 20, 21 correspond with the portions 3, 4. Each has a flange at one end as before which, however, have a coned form designated at 22, and these, as with the portions 3 and 4, may preferably be of hardened steel. 23 and 24 are two rings of a metal different from that of the cones 22. These lie back to back while their outer sides have coned recesses providing seats of a form corresponding in shape to and adapted to receive the cones 22, the dissimilar metals preventing squeaking of the parts in use.

25 is a body portion corresponding somewhat to the member 9 described, but which is bored to receive the rings 23, 24 and hold them in a driving fit, said member being extended into a stem 26 as in the other form described.

27 is a bushing which, as before, lies within and snugly fits the portions 20, 21 and the rings 23, 24, the latter turning thereon while the said portions 20 and 21 are secured with respect to it by rods 28 serving the same purpose as the rods 14, 15. Again, as before, the rods when screwed into the bushing hold the coned parts in snug and smooth working relation. 29 is a duct in the bushing leading to the surfaces between the latter and the rings 23, 24 which supplies oil to those surfaces, and to the coned portions 22 and their seats in said rings.

The structures illustrated provide for a joint of light weight, yet thoroughly strong, and one that can be kept within small dimensions, while at the middle portion, between the rods 14, 15 and 28, the parts can be enlarged and so arranged that in addition to the snug working joint between the bushings and the central parts having the stems 10, 26, the ball races of one form, or the cones of the other, form bearings which lie in planes perpendicular to the said joint between the bushing and said parts, lending great rigidity and a more freely working affair besides preventing lateral strains with accompanying tendency to squeaks.

In the one form, the balls take the lateral strains and prevent squeaking, while in the other, the cones 22 and the dissimilar metal of the rings 23 and 24 act in the same capacity.

I claim:

1. In an ankle joint, the combination with the ankle and foot members of an artificial limb, of a pair of tubular members disposed in axial alignment and lying transversely of and between the said members, said tubular members having spaced relation, a solid main body portion enclosed by the tubular members, a pair of stems depending from the said ankle member, each passing through one of the said tubular members and both extending into the main body portion perpendicular to the axes of those parts, said stems permanently spacing apart the said tubular members, and a stem arising from the foot member, the same enclosing the main body portion and adapted to turn upon it and having a working position between the facing ends of the said spaced tubular members.

2. In an ankle joint, the combination with the ankle and foot members of an artificial limb, of a pair of tubular members disposed in axial alignment and lying transversely of and between the said members, said tubular members having spaced relation, a solid main body portion enclosed by the tubular members, a pair of stems depending from the said ankle member, each passing through one of the said tubular members and both extending into the main body portion perpendicular to the axes of those parts, said stems permanently spacing apart the said tubular members, a stem arising from the foot member, the same enclosing the main body portion between the tubular members and adapted to turn upon it and having a working position between the facing ends of said tubular members, and anti-friction devices interposed between the said facing ends of the tubular members and said stem where it encloses the main body portion.

In testimony whereof I affix my signature in presence of two witnesses.

WILLIAM H. WAMBSGANS.

Witnesses:
J. H. KINGSBURY,
L. M. THURLOW.